(12) United States Patent
Reif et al.

(10) Patent No.: US 8,673,433 B2
(45) Date of Patent: Mar. 18, 2014

(54) LOAD-PULLING SYSTEM

(71) Applicant: SGL Carbon SE, Wiesbaden (DE)

(72) Inventors: Bernd Reif, Kottgeisering (DE); Florian Gojny, Kelkheim (DE); Tobias Schmidt, Augsburg (DE)

(73) Assignee: SGL Carbon SE, Wiesbaden (DE)

( * ) Notice: Subject to any disclaimer, the term of this patent is extended or adjusted under 35 U.S.C. 154(b) by 0 days.

(21) Appl. No.: 13/778,457

(22) Filed: Feb. 27, 2013

(65) Prior Publication Data

US 2014/0004298 A1   Jan. 2, 2014

Related U.S. Application Data

(63) Continuation of application No. PCT/EP2011/060296, filed on Jun. 21, 2011.

(30) Foreign Application Priority Data

Aug. 27, 2010   (DE) .......................... 10 2010 035 683
Oct. 12, 2010   (DD) .......................... 10 2010 042 357

(51) Int. Cl.
*B66B 11/08*   (2006.01)
*F16G 1/08*   (2006.01)

(52) U.S. Cl.
USPC ........ 428/212; 428/295.4; 474/263; 474/264; 474/266; 474/268; 187/251

(58) Field of Classification Search
USPC ............... 428/212, 295.4; 474/263, 264, 266, 474/268; 187/251, 254, 255
See application file for complete search history.

(56) References Cited

U.S. PATENT DOCUMENTS 7,661,514 B2   2/2010   Ach
7,926,649 B2   4/2011   Göser

FOREIGN PATENT DOCUMENTS

DE   10 2004 030 722 A1   1/2006
EP   2 305 591 A1   4/2011
WO   2010/072690 A1   7/2010

OTHER PUBLICATIONS

International Search Report of PCT/EP2011/060296.

*Primary Examiner* — Alexander Thomas
(74) *Attorney, Agent, or Firm* — Laurence A. Greenberg; Werner H. Stemer; Ralph E. Locher (57) ABSTRACT

A load-pulling system includes a least one belt to which a tensile load is applied. The belt is formed of a matrix and a load-bearing fiber structure embedded in the matrix and having a plurality of fibers. The belt is guided around a least one deflection device in such a way that it forms a curved section in the region of the deflection device. A dimensioning of the belt and the applied tensile load are matched to each other in such a way that, in the curved section of the belt, a zero stress line of the belt is displaced radially inward in the direction of curvature with respect to a center line of the load-bearing fiber structure by an amount of at least 25% of the thickness of the load-bearing fiber structure.

20 Claims, 4 Drawing Sheets

LOAD-PULLING SYSTEM

CROSS-REFERENCE TO RELATED APPLICATION

This application is a continuation, under 35 U.S.C. §120, of international patent application PCT/EP2011/060296, filed Jun. 21, 2011, which designated the United States; the application also claims the priority, under 35 U.S.C. §119, of German patent applications Nos. DE 10 2010 035 683.2, filed Aug. 27, 2010 and DE 10 2010 042 357.2, filed Oct. 12, 2010; the prior applications are herewith incorporated by reference in their entirety.

BACKGROUND OF THE INVENTION

Field of the Invention

The present invention relates to a load-pulling system, e.g. elevator system, comprising at least one belt to which a tensile load is applied, and comprising at least one deflection device around which the belt is guided.

It is known in a load-pulling system of this type to use a belt comprising a matrix and a fiber structure with a plurality of fibers which receive the tensile load, and which is embedded in the matrix. These fibers can, for example, comprise carbon fibers which have a high tensile loading capacity but at the same time are sensitive to compressions.

In prior load-pulling systems with belts, in which compression-sensitive fibers are used, a comparatively short lifetime of the belt is usually observed, which constitutes a certain risk in safety-relevant applications such as for example, in passenger elevator systems.

SUMMARY OF THE INVENTION

It is accordingly an object of the invention to provide a load pulling system which overcomes the above-mentioned disadvantages of the heretofore-known devices and methods of this general type and which provides for a load-pulling system that operates reliably and safely for an extended period of time.

With the foregoing and other objects in view there is provided, in accordance with the invention, a load-pulling system, comprising:

a belt subject to a tensile load, said belt being formed of a matrix and a load-bearing fiber structure formed of a plurality of fibers embedded in said matrix, said load-bearing fiber structure having a center line and a given thickness;

said belt being guided around at least one deflection device, wherein a curved section of said belt is formed in a region of the deflection device;

wherein a dimensioning of said belt and the tensile load applied to said belt are matched to each other such that, in the curved section of said belt, a zero stress line of said belt is displaced radially inwards in a direction of curvature with respect to said center line of said load-bearing fiber structure by an amount of at least 25% of the given thickness of the load-bearing fiber structure.

In other words, the objects of the invention are achieved with a load-pulling system having the foregoing features. The load-pulling system according to the invention, may, for example, be an elevator system. It includes at least one belt to which a tensile load is applied. The at least one belt comprises a matrix and a load-bearing fiber structure embedded in the matrix and having a plurality of fibers, and which is led around at least one deflection device in such a manner that it has a curved section in the region of the deflection device. According to the invention, the dimensioning of the belt and the applied tensile load are matched to each other in such a manner that, in the curved section of the belt, a zero stress line of the belt is displaced radially inwards in the direction of curvature with respect to a center line of the load-bearing fiber structure by an amount of at least 25% of the thickness of the load-bearing fiber structure.

The load-bearing fiber structure is understood here as the arrangement of those fibers which receive the tensile load applied to the belt and thus ultimately define the tensile loading capacity of the belt. The load-bearing fiber structure can comprise a plurality of fiber substructures, as is explained hereinafter. When there is talk herein of the fiber structure or the fibers, this therefore means the load-bearing fiber structure or the fibers of the load-bearing fiber structure.

The invention is based on the finding that the reduced lifetime of a belt comprising fibers is in particular associated with the fact that in the region of the deflection device, a curvature of the belt is accomplished in such a manner that a compressive stress acts on the fibers lying further inwards. As a result of this compressive stress, the inner fibers are compressed and the stability of these fibers and therefore of the belt as a whole is impaired. In particular, there is a risk that fibers inside the belt are bent. The compression of the inner fibers consequently has a negative influence on the long-term stability of the belt and on the long-term safe function of the load-pulling system as a whole.

The general inventive idea now consists in displacing the zero stress line of the belt in the curved section radially inwards as far as possible in the direction of curvature by a suitable dimensioning of belt and applied tensile load. The zero stress line defines the region of the belt at which the tensile stresses and compressive stresses in the belt cancel out. The zero stress line thus divides the cross-sectional area of the belt into a region under compressive stress and a region under tensile stress. As a result of the displacement of the zero stress line radially inwards, the fraction of the fibers which are compressed, i.e. under compressive stress in the curved section of the belt is minimized.

Ideally none of the fibers of the load-bearing fiber structure in the curved section should be compressed, i.e. the zero stress line should run on the curvature inner edge of the fiber structure or further inwards. However, it was established that a small fraction of compressed fibers lying on the curvature inner side of the zero stress line can be tolerated since the belt wear caused by the few compressed fibers is then so small that the long-term tensile stability of the belt is at least not substantially impaired.

In order to bring about a sufficient displacement of the zero stress line inwards in relation to the thickness of the fiber structure, a thinner belt can be used where the required load-bearing capacity of the belt can be ensured at the same time by a corresponding increase in the belt width. The reduction of the belt thickness has the effect that in the curved section of the belt, the predominant fraction of the load-bearing fibers is under tensile stress.

The invention therefore does not provide any use of thicker belts under greater tensile loads for a permanently reliable function of the belt in a contra-intuitive manner but on the contrary a thinner—and possibly wider—configuration of the belt which has the result that the smallest possible fraction of fibers is under compressive stress in a curved belt section. Alternatively or additionally an additional tensile load can be applied to the belt and/or the pulley diameter of the deflecting device can be adjusted.

The displacement of the zero stress line in the curved section can be calculated as described hereinafter as a function of the properties of the load-pulling system. For the following example a symmetrical belt is assumed in which the center of the fiber structure coincides with the center of the belt and which is deflected over a deflecting pulley or roller having a constant radius around 180°.

When viewed over the deflection angle of 180°, a length difference Δd is obtained between the fiber located the furthest outside of the curvature and the fiber of the fiber structure located the furthest inside of the curvature as $$\Delta d = (r_{outer} - r_{inner}) \cdot \pi \quad (1)$$

where $r_{outer}$ is the distance of the outermost fiber from the curvature center point and $r_{inner}$ is the distance of the innermost fiber from the curvature center point.

The change $\Delta d_b$ of the length of the outermost and innermost fibers compared with their relaxed state caused by the curvature or bending of the belt is obtained from this as $$\Delta d_b = +\frac{\Delta d}{2} \quad (2)$$

or $$\Delta d_b = -\frac{\Delta d}{2}.$$

The corresponding stretching $\pounds_b$ of the outermost and innermost fibers is obtained from this as $$\varepsilon_b = \frac{+|\Delta d_b|}{\frac{r_{pulley} \cdot 2\pi}{360°} \cdot 2\alpha} \quad (3)$$

or $$\varepsilon_b = \frac{-|\Delta d_b|}{\frac{r_{pulley} \cdot 2\pi}{360°} \cdot 2\alpha}$$

where $r_{pulley}$ is the outside radius of the pulley and $\alpha$ is half the wrap-around angle of the belt around the pulley, i.e. in this example $\alpha=90°$.

The stress $\sigma_b$ of the innermost and outermost fiber caused by the bending is obtained from this as $$\sigma_b = +E_b \cdot |\varepsilon_b| \text{ or } \sigma_b = -E_b \cdot |\varepsilon_b| \quad (4)$$

where $E_b$ is the bending modulus of the belt, which is calculated as follows $$E_b = \frac{-\sum_{i=1}^{n} E_{IIi} \cdot I_i}{I_{ges}} \quad (5)$$

where n is the number of layers i of the belt which, for example, comprises an upper and a lower matrix layer as well as a layer which contains the fiber structure, where $E_{IIi}$ is the modulus of elasticity of the i-th layer in the fiber direction, where $I_i$ is the resistance moment of the i-th layer with respect to bending and where $I_{ges}$ is the resistance moment of the entire belt with respect to bending.

The overall effective stress $\sigma_{eff}$ in the outermost and innermost fibers is obtained by a superposition of the stress caused by the bending and the stress caused by the tensile load, i.e.

$$\sigma_{eff} = \sigma_N + |\sigma_b| \text{ or } \sigma_{eff} = \sigma_N - |\sigma_b|. \quad (6)$$

Here $\sigma_N$ designates the stress caused by the normal force of the tensile load which, for example, in the case of a tensile load formed by a load body having the mass $m_{Load}$ and received by the fiber structure, is obtained as $$\sigma_N = \frac{m_{load} \cdot g}{A_{belt}} \quad (7)$$

Here g designates the acceleration due to gravity and $A_{Belt}$ is the load-bearing cross-sectional area of the belt, therefore approximately the cross-sectional area of the fiber structure.

From the above equations (6) and (7), assuming a linear profile of the stress in the fiber structure in the radial direction from the outermost to the innermost fiber, a displacement e of the zero stress line with respect to the center line is obtained as $$e = \frac{r_{outer} - r_{inner}}{2} - \frac{-(r_{outer} - r_{inner})}{(\sigma_N - |\sigma_b|) - (\sigma_N + |\sigma_b|)} \cdot (\sigma_N + |\sigma_b|), \quad (8)$$

$$e = \frac{r_{outer} - r_{inner}}{2} - \frac{-(r_{outer} - r_{inner})}{-2|\sigma_b|} \cdot (\sigma_N + |\sigma_b|). \quad (8')$$

The displacement λ of the zero stress line relative to the thickness of the load-bearing fiber structure, i.e. $r_{outer} - r_{inner}$ is obtained from this as $$\lambda = \frac{e}{r_{outer} - r_{inner}} \cdot 100\%. \quad (9)$$

In order to increase the lifetime of the belt in the load-pulling system still further, the dimensioning of the belt and the applied tensile load can be matched to one another in such a manner that in the curved section, the zero stress line is displaced radially inwards in the direction of curvature with respect to the center line of the load-bearing fiber structure by an amount of at least 30%, preferably at least 40% and particularly preferably at least 50% of the thickness of the load-bearing fiber structure. In the latter case, the zero stress line is displaced at least as far as the inner edge of the load-bearing fiber structure so that substantially all the fibers of the load-bearing fiber structure are under tensile stress or a zero load. The zero stress line can also be situated further inwards and thus run outside the fiber structure or even outside the belt, where in the latter case all the regions of the belt are under tensile stress.

The increase in the lifetime of the belt achieved within the framework of the invention is particularly marked when compression-sensitive fibers are used in the load-bearing fiber structure, i.e. fibers whose compressive load-bearing capacity is significantly lower than their tensile load-bearing capacity. Examples of these are carbon fibers, glass fibers, polymer fibers, aramide fibers and basalt fibers. The fiber structure can comprise one or several of the aforesaid fiber types and any mixtures of these types.

The matrix preferably comprises a polymer material. In principle, thermoplastics, elastomers or thermosetting plastics are suitable.

In order to achieve a desired displacement of the zero stress line, it is advantageous if not only the belt as a whole but particularly the load-bearing fiber structure are designed to be thinner and broader than hitherto. Preferably an aspect ratio, i.e. a ratio of width to thickness, of the fiber structure lies in the range between 2 and 100, further preferably between 20 and 60 and particularly preferably between 30 and 50. The belt as a whole can, for example, have an aspect ratio between 1 and 30, preferably between 2 and 20 and particularly preferably of about 10.

The thickness of the fiber structure can, for example, be less than or equal to 0.025 times, preferably less than or equal to 0.015 times and particularly preferably less than or equal to 0.008 times a radius of curvature of the belt in the curved section.

According to a further advantageous embodiment, the belt is configured so that in the unloaded state of the belt the fibers of the fiber structure are pre-stressed by the matrix under tensile stress. That is to say, the fibers are embedded in the matrix so that already in the unloaded straight belt the fibers of the fiber structure are held under tensile stress by the matrix. Such an internal pre-stressing of the fibers can be achieved, for example, by placing the fibers under tensile stress by applying a tensile force during manufacture of the belt and embedding them in the matrix in this pre-stressed state. If the applied tensile stress is cancelled after manufacture, an internal stress is established between the fibers of the fiber structure and the matrix material. By providing such an internal pre-stress, the tensile stress occurring in the region of the curved section can be regulated in addition to suitable pairing of belt and tensile load in the sense of the invention.

The pre-stress of the fibers of the fiber structure exerted by the matrix in the unloaded state of the belt can, for example, be between 1 to 95%, preferably between 5 to 80% and particularly preferably between 10 and 35% of the breaking stress of the fibers.

According to a further advantageous embodiment of the invention, the belt has at least one pressure zone which is disposed on the side of the belt facing the deflection device and has a material having a modulus of elasticity which is greater than the modulus of elasticity of the material of the matrix.

Such an inner pressure zone in relation to the direction of curvature receives compressive stresses which occur in the region of the deflection device. The fibers of the fiber structure thus come under tensile stress more easily and the zero stress line is displaced still further inwards. Advantageous results are achieved, for example, if the modulus of elasticity of the material of the pressure zone is between 20% and 30% larger than the modulus of elasticity of the matrix material. The pressure zone can also comprise an anisotropic material whose elasticity in relation to tensile stress is greater than its elasticity in relation to compressive stresses.

The pressure zone can, for example, be formed by a material layer which is substantially continuous and extends in the longitudinal direction of the belt. A particularly favorable stress distribution in the belt is additionally obtained if the pressure zone has a structuring. The structuring can, for example, comprise a toothed structure, a perforation or a folding. Such a structured pressure zone is particularly suitable for allowing a pressure forming of the belt without the fibers of the fiber structure coming under compressive stress.

According to a further advantageous embodiment, the pressure zone comprises a toothed structure having a plurality of teeth, where the teeth each have a shell and a filling, wherein the filling comprises a material having a modulus of elasticity which is greater than the modulus of elasticity of a material of the shell.

The structuring of the pressure zone can either be formed on the surface of the belt or formed underneath the belt, e.g. covered by a continuous outer layer, in the interior of the belt. Structuring formed in the interior of the belt have the advantage of lower sensitivity to dirt, whereby a higher wear resistance can be achieved. At the same time, running noise caused by running of the belt on the deflection device is reduced.

The pressure zone is expediently designed so that it ensures a reliable transmission of drive forces between the belt and the deflection device. The pressure zone can in particular be configured for positive and/or non-positive force transmission between belt and deflection device.

According to a further embodiment of the invention, the pressure zone is designed so that in the non-installed state of the belt, it prevents any falling below a permissible bending radius of the belt and thus any damage to the fiber structure.

One or more pressure zones of the belt can be flexibly adapted to the requirements of the respective specific load-pulling system. If, for example, during operation of the load-pulling system, only a limited length region of the belt runs over the deflection device in the course of operation and is curved by this device, a pressure zone can substantially only be provided in this region. Likewise, a pressure zone can only be provided on one side of the belt if the belt is only curved in one direction in the load-pulling system or a pressure zone can be provided on both sides of the belt if the belt is curved in different directions by a plurality of deflection devices where each pressure zone is preferably adapted to the maximum curvature in the respective direction.

In a load-pulling system in which the belt is curved perpendicular to its transverse axis is both directions by a plurality of deflection devices having substantially the same radii of curvature, the belt can be configured to be substantially symmetrical about its transverse axis. Correspondingly, in a load-pulling system in which the belt is curved in both directions with different radii of curvature, the belt can be constructed asymmetrically about the transverse axis.

Particularly favorable results regarding the long-term stability of the belt can further be achieved if at least one, and in particular approximately all, the fibers of the fiber structure are oriented substantially in the longitudinal direction of the cable. In this case, a plurality of fibers of the belt can be twisted with one another or untwisted. In order to achieve a high tensile load-bearing capacity of the belt, a plurality of and in particular all the fibers of the fiber structure preferably extend over at least approximately the entire length of the belt.

The fiber structure of the belt can comprise at least one fiber substructure which is selected from a group comprising a unidirectional multifilament strand, a twisted or untwisted multifilament yarn, a woven fabric, a scrim, a knitted fabric and a crocheted fabric. Within a fiber substructure, the fibers contained in the fiber substructure are preferably substantially homogeneous and distributed uniformly over the cross-section of the structure.

The thickness of a unidirectional multifilament strand is in this case is preferably less than or equal to 0.008 times a radius of curvature of the belt in the curved section, which can, for example, be predefined by a radius of a deflection pulley of the deflection device. The thickness of a twisted multifilament yarn is preferably less than or equal to 0.025 times and particularly preferably less than or equal to 0.015 times a radius of curvature of the belt in the curved section. Specifically the thickness of a fiber substructure and/or the fiber structure overall can, for example, be between 0.3 mm and 2 mm. A twisted multifilament yarn can have, at least in certain sections, between 1 and 500, preferably between 30 and 120 and particularly preferably between 50 and 100 strokes per meter of yarn length. If the fiber structure comprises a woven fabric, the warp fraction of the woven fabric is preferably higher than its weft fraction. Warp fraction and weft fraction can also comprise different fiber types, where, for example, the warp fraction consists largely of plastic fibers and the weft fraction consists largely of polymer fibers or polyester fibers.

The fiber structure can comprise a plurality of adjacently disposed fiber substructures in the transverse direction of the belt, in particular a plurality of adjacently disposed unidirectional multifilament strands in the transverse direction of the belt or a plurality of adjacently disposed twisted multifilament yarns in the transverse direction of the belt. In principle the fiber structure can also comprise a plurality of fiber substructures arranged one above the other in the height direction of the belt.

In order to avoid a torsion moment occurring in the cable when using twisted multifilament yarns, the fiber structure according to an advantageous embodiment comprises at least one multifilament yarn twisted with a z-stroke and at least one multifilament yarn twisted with an s-stroke, which are spaced apart from one another in the transverse direction of the belt. The fiber structure can also comprise a plurality of multifilament yarns twisted with a z-stroke and a plurality of multifilament yarns twisted with an s-stroke, wherein when viewed in the transverse direction of the belt, the z-twisted multifilament yarns alternate with the s-twisted multifilament yarns.

The belt can comprise a plurality of curved belt sections having different curvature, for example, if a plurality of deflection pulleys with different pulley radii are used. In this case, it is preferred according to the invention if the dimensioning of the belt and the applied tensile load are matched to one another so that the zero stress line in the belt section in which a maximum curvature occurs is displaced radially inwards in the direction of curvature with respect to the center line of the load-bearing fiber structure by at least 25% of the thickness of the load-bearing fiber structure.

A further subject matter of the present invention is a belt, in particular for use in a load-pulling system such as, for example, a passenger elevator system which comprises a matrix and a fiber structure embedded in the matrix having a plurality of compression-sensitive fibers, where the fibers are embedded in the matrix so that in the unloaded state of the belt, the fibers of the fiber structure are pre-stressed under tensile stress by the matrix material.

Other features which are considered as characteristic for the invention are set forth in the appended claims.

Although the invention is illustrated and described herein as embodied in a load-pulling system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
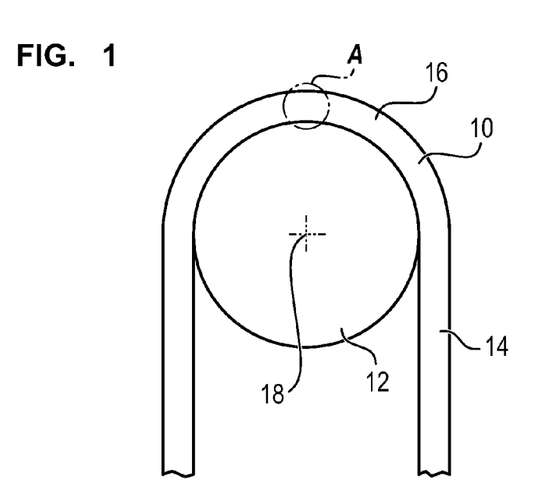
FIG. 1 is a side view of a load-pulling system according to the invention with a belt guided around a deflection device.

Referring now to the figures of the drawing in detail and first, particularly, to FIG. 1 thereof, there is shown, in a schematic side view, one embodiment of a load-pulling system according to the invention which, for example, can be a passenger elevator system. The load-pulling system comprises a belt 10 which is guided over a deflection pulley 12, also referred to as a headwheel or a reversing pulley 12. The belt 10 runs on the deflection pulley 12 during the operation of the load-pulling system. The deflection pulley 12 can be mounted to be rotatably drivable about an axis of rotation 18 and be configured for deflection of the belt 10 and for driving the belt 10. At one end of the belt 10 there is suspended a load, such as an elevator cabin having a mass of, say, 400 to 700 kg (i.e., weight of 880 to 1540 lb). At the other end of the belt 10, there is suspended a counterweight, whose mass can approximately correspond to the mass of the load.

The belt 10 has a substantially straight section 14 at a distance from the deflection pulley 12 and a curved section 16 in the region of the deflection pulley 12.

Figure 2:
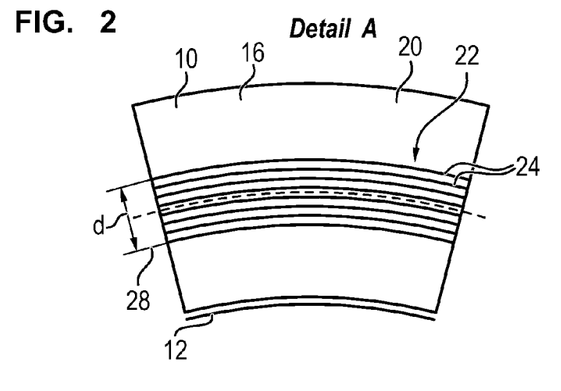
FIG. 2 shows a longitudinal section of the region A from FIG. 1 with a zero stress line running through the center of a fiber structure of the belt.
Figure 3:
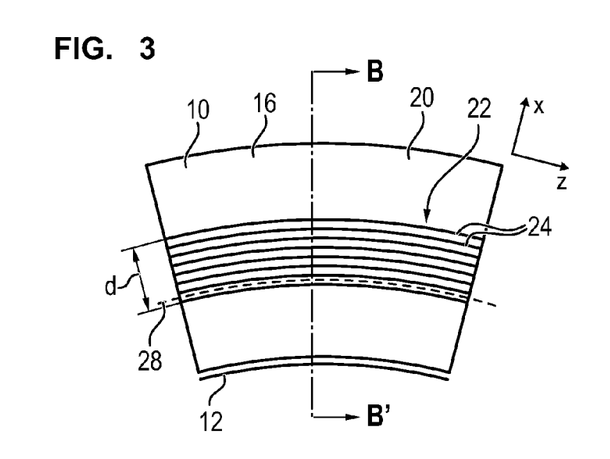
FIG. 3 shows the longitudinal section of the region A from FIG. 1 with a zero stress line displaced from the center of the fiber structure.
Figure 4:
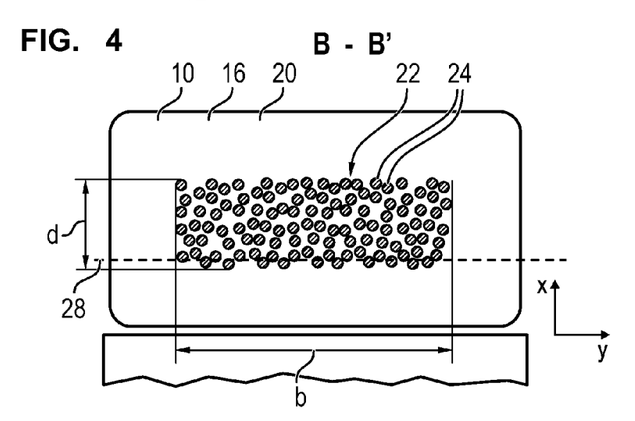
FIG. 4 shows a cross-sectional view of the load-pulling system along the line B-B' from FIG. 2.

As illustrated in FIGS. 2 to 4, the belt 10 comprises a matrix 20 and a fiber structure 22 embedded in the matrix 20, which receives the applied tensile load and comprises a plurality of compression-sensitive fibers 24 arranged one above the other in the height direction x of the belt. The fiber structure 22 has a thickness d in the height direction x of the belt 10 and a width b in the transverse direction y of the belt 10. As shown in FIG. 2, the fibers 24 in the present exemplary embodiment are oriented in the longitudinal direction z of the belt 10. The fibers 24 extend here over at least approximately the entire length of the belt 10.

For better clarity only some fibers 24 are shown in FIGS. 2 and 3. The actual number of fibers can in reality be significantly higher and their diameter significantly smaller compared to the thickness d of the belt 10. As shown in FIGS. 2 and 3, the deflection of the belt 10 by the deflection pulley 12 leads to a curvature of the belt 10. The curvature brings about a tensile stress in the fiber structure 22, which decreases substantially linearly from radially outwards to radially inwards. Therefore the fibers 24 lying further inwards in relation to the curvature are more strongly compressed or less strongly tensioned than the fibers 24 located further outwards.

In order to achieve an increased lifetime of the belt 10, in the load-pulling system shown the dimensioning of the belt 10 on the one hand and the weight of the load and the counterweight on the other hand are matched to one another in such a manner that in the curved section 16 of the belt 10 the zero stress line 28 of the belt 10 is displaced inwards in the direction of curvature as shown in FIG. 3 with respect to the center line of the load-bearing fiber structure 22. A tensile stress acts on the fibers 24 situated above the zero stress line 28, i.e. radially further outwards in relation to the curvature and a compressive stress acts on the fibers 24 below the zero stress line 28, i.e., radially further inwards in relation to the curvature. Whereas when the belt 10 is merely curved but not associated with a tensile load, the zero stress line 28, as shown in FIG. 2 for comparison, would coincide with the center line of the fiber structure 22, in the present load-pulling system it is displaced significantly radially inwards by the applied tensile load, i.e. towards the deflection pulley 12 and specifically by an amount of more than 25% of the thickness d of the fiber structure 22.

In the present load-pulling system, in other words this displacement is so marked as a result of a corresponding dimensioning of belt 10 and tensile load that in the curved section 16 only a very few fibers 24 are compressed and most of the fibers 24 are under tensile stress. The load-bearing capacity of the belt 10 is therefore not significantly impaired in the case of some damage to fibers 24 by compression.

Ideally the belt 10 and the tensile load are matched to one another so that at least approximately no fibers 24 are under compressive stress in the curved section 16 or the fibers 24 situated radially furthest inward are at most under a zero stress. The stress zero line therefore runs in this case at the inner edge of the fiber structure or even further inwards.

Figure 5:
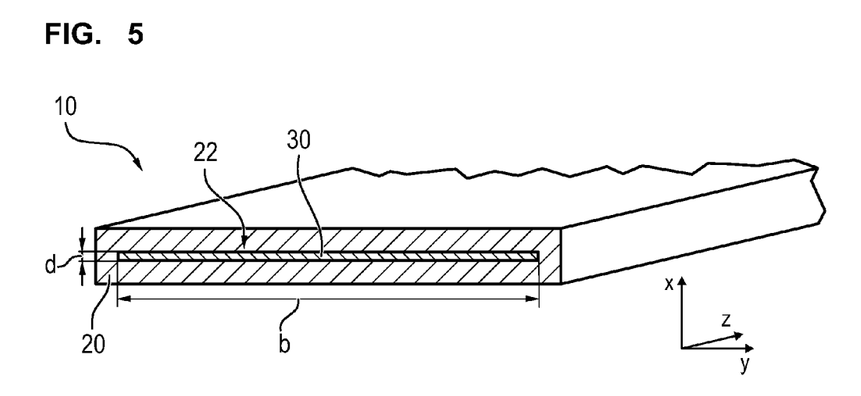
FIG. 5 shows a perspective cross-sectional view of a belt according to one embodiment.

FIG. 5 shows a perspective cross-sectional view of a belt 10 according to one possible embodiment. The fiber structure 22 is here formed by a unidirectional multifilament strand 30, where the fibers, which are not shown individually in FIG. 5, are embedded in a matrix 20 as in FIGS. 2 to 4. The thickness d of the unidirectional multifilament strand 30 is less than or equal to 0.008 times the radius of a deflection pulley, not shown, of the load-pulling system around which the belt 10 is guided.

Figure 6:
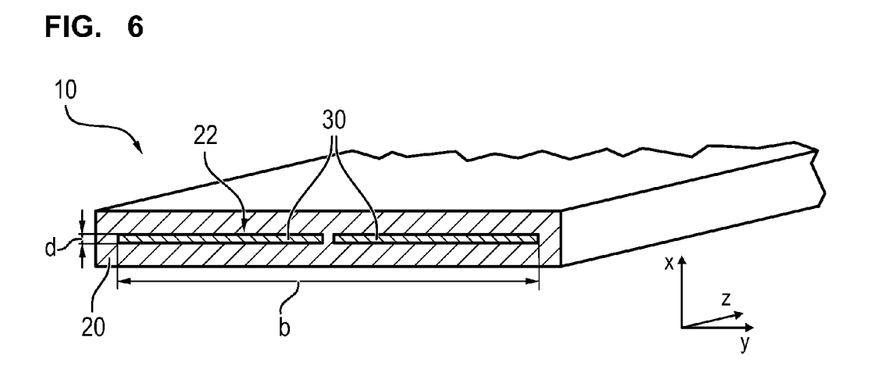
FIG. 6 shows a perspective cross-sectional view of a belt according to a further embodiment.

FIG. 6 shows a perspective cross-sectional view of a further embodiment of a belt 10, in which the fiber structure 22 comprises two unidirectional multifilament strands 30 arranged next to one another in the transverse direction y of the belt, whose thickness d is less than or equal to 0.008 times the radius of a deflection pulley, not shown, of the load-pulling system around which the belt 10 is guided.

Figure 7:
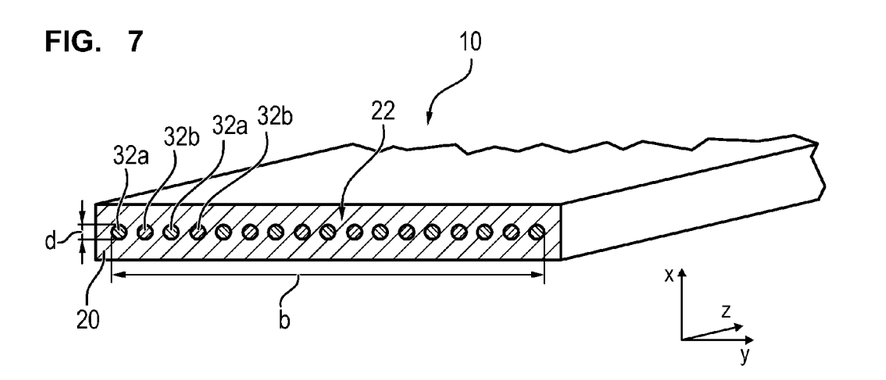
FIG. 7 shows a perspective cross-sectional view of a belt according to a further embodiment.

FIG. 7 shows a perspective cross-sectional view of a further embodiment of a belt 10, in which the fiber structure 22 comprises a plurality of twisted multifilament yarns arranged next to one another in the transverse direction y of the belt, whose thickness d is less than or equal to 0.025 times the radius of a deflection pulley, not shown, of the load-pulling system around which the belt 10 is guided. Here the z-twisted multifilament yarns 32a and the s-twisted multifilament yarns 32b alternate when viewed in the transverse direction y.

Figure 8:
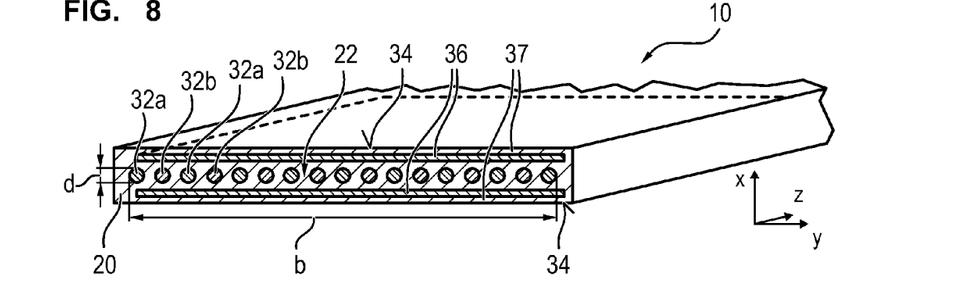
FIG. 8 shows a perspective cross-sectional view of a belt according to a further embodiment.

The belt 10 shown in FIG. 8 is substantially identical to that shown in FIG. 7 apart from the fact that the belt shown in FIG. 8 has two pressure zones 36 arranged in the region of the flat sides 34 of the belt 10, which are each formed under the surface of the belt 10 and are covered by an outer layer 37. The pressure zones 36 are formed from a material having a modulus of elasticity which is higher than the modulus of elasticity of the material of the matrix 20. The pressure zones 36 therefore additionally prevent pressure being applied to the fibers of the fiber structure 22 in a curved section of the belt 10. The pressure zone 36 located inside in relation to the curvature in each case acts as a buffer which receives the ensuring compressive forces and keeps them away from the fibers. When viewed in cross-section, the belt 10 is symmetrical so that the belt 10 is equally robust with respect to curvatures in both directions about its transverse axis.

Figure 9:
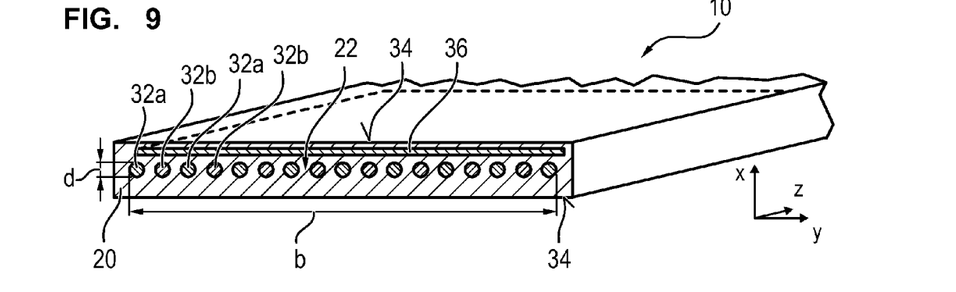
FIG. 9 shows a perspective cross-sectional view of a belt according to a further embodiment.

The belt 10 shown in FIG. 9 differs from the belt shown in FIG. 8 in that a pressure zone 36 is only provided on one of the flat sides 34 of the belt 10. When viewed in cross-section, the belt 10 is therefore asymmetric. The belt 10 shown in FIG. 9 is therefore particularly suitable for use in load-pulling systems in which the belt 10 is only curved in one direction, where the pressure zone 36 should advantageously point in the direction of the curvature inside.

Figure 10:
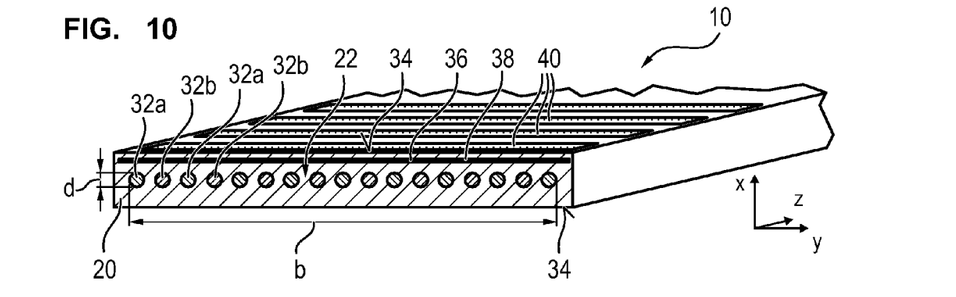
FIG. 10 shows a perspective cross-sectional view of a belt according to a further embodiment.

FIG. 10 shows a belt 10 having a pressure zone 36 which is formed by a toothed structure 38 provided on one flat side 34 of the belt 10. In this case, the teeth 40 of the tooth structure 38 comprise a material having a modulus of elasticity which is higher than the modulus of elasticity of the material of the matrix 20. In the present exemplary embodiment the toothed structure 38 is arranged on the surface of the belt 10. In principle however the toothed structure 38 could also be formed under the surface of the belt 10, i.e. in the belt interior, like the pressure zones 36 shown in FIGS. 8 and 9. As previously, the belt 10 should preferably be used so that the pressure zone 36 points in the direction of the curvature inside.

Figure 11:
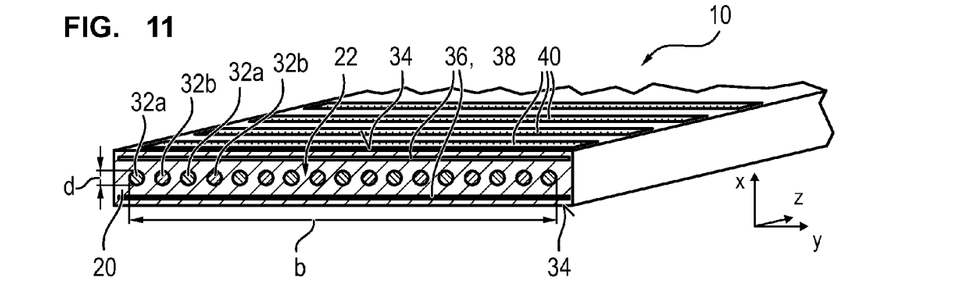
FIG. 11 shows a perspective cross-sectional view of a belt according to a further embodiment.

FIG. 11 shows a belt 10 which has a toothed structure 38 as shown in FIG. 10 on both flat sides 34 of the belt 10.

It is obvious that the pressure zones 36 shown in FIGS. 8 to 11 can also be used in any belt 10 shown in FIGS. 1 to 7.

Figure 12:
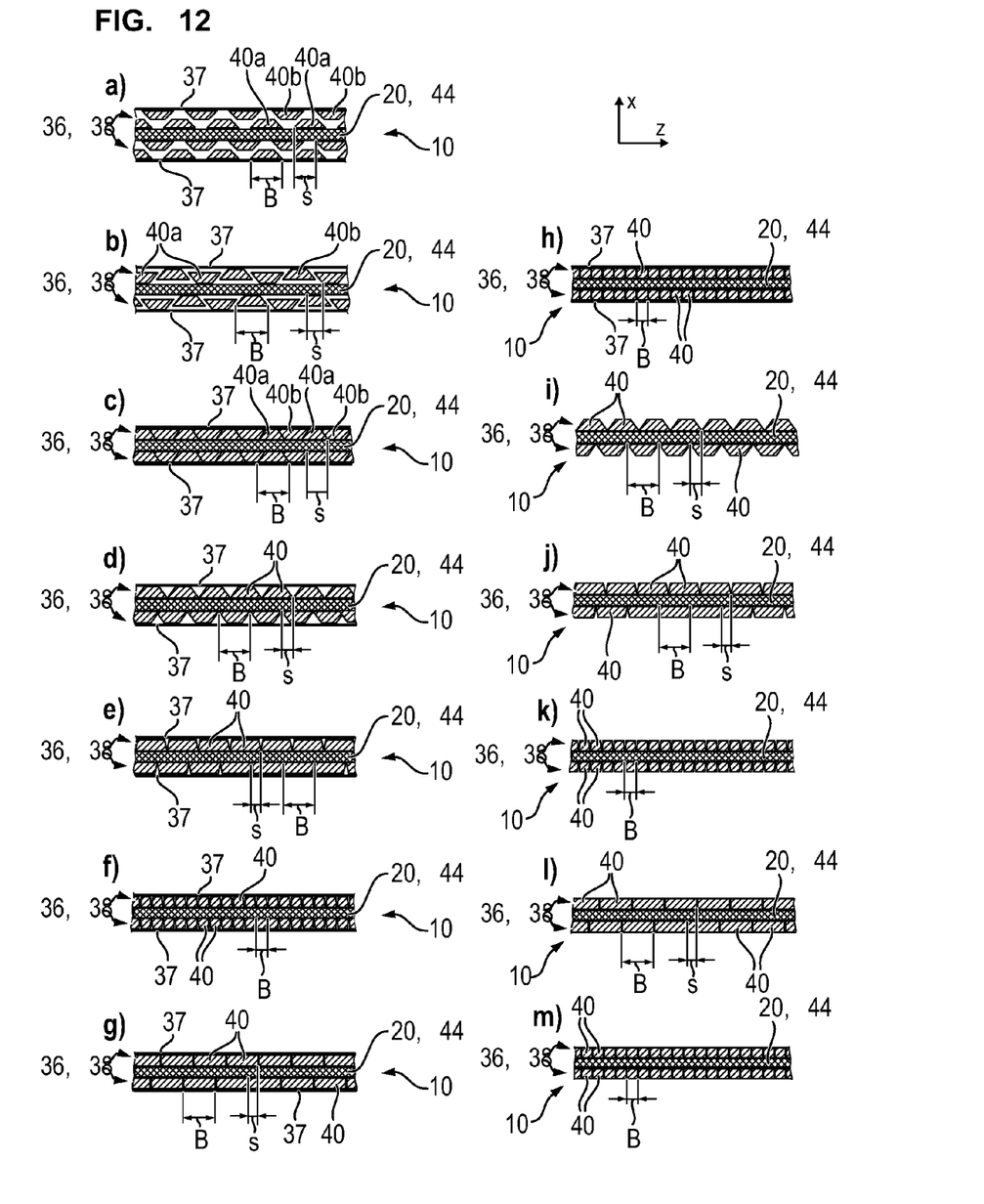
FIG. 12, part a) to m), show longitudinal sectional views of belts with mutually different pressure zones.

FIG. 12 shows different belts 10 in longitudinal section, in each case in the unloaded state of the belt 10, where the belts 10 are provided with pressure zones 36 comprising different toothed structures 38. The belts shown in FIG. 12 each have pressure zones 36 arranged on both flat sides but belts 10 are also possible in which a corresponding pressure zone 36 is only arranged on one of the flat sides 34.

The teeth 40 of the toothed structures 38 are configured to be elongated in the transverse direction y of the belt, i.e. perpendicular to the plane of the drawing in FIG. 12 and extend in this direction preferably at least approximately over the entire width of the belt 10.

As shown in FIGS. 12a) to 12f) and FIGS. 12i) to 12k), the teeth 40 preferably have an at least approximately trapezoidal cross-section. As illustrated in FIGS. 12g), 12h), 12l) and 12m), they can also have a square cross-section.

The pressure zones can, as shown in FIG. 12i) to m), be arranged on the surface of the belt 10 or, as shown in FIG. 12a) to h), be arranged below the surface of the belt 10, covered by an outer layer 37.

As shown in FIGS. 12a) to 12c), a toothed structure 38 can comprise two mutually opposite rows of teeth 40a, 40b, where one row of teeth 40a is applied to a base body 44 of the belt 10 comprising the matrix 22 and the fiber structure and the other row of teeth 40b is attached opposite and decoupled from the base body 44 on the outer layer 37. In this case, in each row of teeth 40a or 40b, the teeth 40a or 40b are preferably arranged spaced apart from one another in the longitudinal direction z of the belt 10 in such a manner that between two teeth 40a or 40b of one row an intermediate space is formed which is configured to be approximately complementary to the teeth 40b or 40a of the respectively other opposite row.

The two rows of teeth 40a or 40b can further be arranged so that the teeth 40a or 40b of the two rows of teeth partially or completely intermesh and form an undercut in the longitudinal direction z of the belt 10, as shown in FIG. 12b) and c). However, as shown in FIG. 12a), the rows of teeth can also be spaced apart in the height direction x of the belt 10 so that the teeth 40a or 40b of the rows of teeth specifically do not intermesh. If, as shown in FIG. 12b), the teeth 40a or 40b have an outwardly broadening cross-section, the intermeshing rows of teeth 40a or 40b can form undercuts in the height direction x of the belt 10 and thus increase the stability of the belt 10 in the region of the pressure zones 36.

In particular, if a toothed structure 38 comprises only one row of teeth 40, as shown in FIG. 12d) to m), these can directly adjoin one another in the longitudinal direction z of the belt 10.

As shown in FIGS. 12a) to e), g), i), j) and l), the toothed structures 38 arranged on both flat sides 34 can have an offset s in the longitudinal direction z of the belt 10, which is preferably between 0.1 times and 0.5 times the width B of a tooth. The toothed structures 38 can also be arranged without offset, however, as shown in FIGS. 12f), h), k) and m).

The invention claimed is:

1. A load-pulling system, comprising:
a belt subject to a tensile load, said belt being formed of a matrix and a load-bearing fiber structure formed of a plurality of fibers embedded in said matrix, said load-bearing fiber structure having a center line and a given thickness;
said belt being guided around at least one deflection device, wherein a curved section of said belt is formed in a region of the deflection device;
wherein a dimensioning of said belt and the tensile load applied to said belt are matched to each other such that, in the curved section of said belt, a zero stress line of said belt is displaced radially inwards in a direction of curvature with respect to said center line of said load-bearing fiber structure by an amount of at least 25% of the given thickness of the load-bearing fiber structure.

2. The load-pulling system according to claim 1, wherein the dimensioning of said belt and the applied tensile load are matched to one another such that, in the curved section of said belt, the zero stress line is displaced radially inwards in the direction of curvature with respect to said center line of said load-bearing fiber structure by an amount of at least 50% of the given thickness of the load-bearing fiber structure.

3. The load-pulling system according to claim 1, wherein in the region of the deflection device substantially all of said fibers of said fiber structure are under a zero loading or a tensile stress.

4. The load-pulling system according to claim 1, wherein said fiber structure has an aspect ratio of a width to a thickness in a range from 2 to 100 and/or said belt has an aspect ratio of a width to a thickness in a range from 1 to 30.

5. The load pulling system according to claim 4, wherein the aspect ratio of said fiber structure lies between 30 and 50 and the aspect ratio of said belt is approximately 10.

6. The load-pulling system according to claim 1, wherein said fiber structure has a thickness that is less than or equal to 0.025 times a radius of curvature of said belt in the curved section.

7. The load-pulling system according to claim 1, wherein said belt is configured so that, in an unloaded state thereof, said fibers of said fiber structure are pre-stressed by said matrix under tensile stress.

8. The load-pulling system according to claim 7, wherein said fibers of said fiber structure are pre-stressed by said matrix in the unloaded state of said belt in a range between 1% and 95% of a breaking stress of said fibers.

9. The load-pulling system according to claim 7, wherein said fibers of said fiber structure are pre-stressed by said matrix in the unloaded state of said belt in a range between 10% and 35% of a breaking stress of said fibers.

10. The load-pulling system according to claim 1, wherein said belt has at least one pressure zone disposed on a side of the belt facing the deflection device and having a material with a modulus of elasticity greater than a modulus of elasticity of a material of said matrix.

11. The load-pulling system according to claim 10, wherein said pressure zone is formed by a material layer that is substantially continuous and extends in a longitudinal direction of said belt.

12. The load-pulling system according to claim 10, wherein said pressure zone is formed with a structuring selected from the group consisting of a toothed structure, a perforation and a folding.

13. The load-pulling system according to claim 10, wherein said pressure zone comprises a toothed structure formed with a plurality of teeth, each of said teeth having a shell and a filling, said filling comprising a material having a modulus of elasticity greater than a modulus of elasticity of a material of said shell.

14. The load-pulling system according to claim 1, wherein said fiber structure comprises one or more fibers selected from the group consisting of carbon fibers, glass fibers, polymer fibers, aramide fibers and basalt fibers.

15. The load-pulling system according to claim 1, wherein said fiber structure of said belt comprises one or more fiber substructures selected from the group consisting of a unidirectional multifilament strand, a twisted multifilament yarn, an untwisted multifilament yarn, a woven fabric, a scrim, a knitted fabric and a crocheted fabric.

16. The load-pulling system according to claim 15, wherein said fiber structure comprises a plurality of fiber substructures disposed adjacent one another in a transverse direction of said belt.

17. The load-pulling system according to claim 16, wherein said fiber structure comprises a plurality of unidirectional multifilament strands disposed adjacently in the transverse direction of said belt and/or a plurality of twisted multifilament yarns disposed adjacently in the transverse direction of said belt.

18. The load-pulling system according to claim 15, wherein said fiber structure comprises at least one twisted multifilament yarn with, at least in certain areas, between 50 and 100 strokes per meter of yarn length.

19. The load-pulling system according to claim 15, wherein said fiber structure comprises at least one multifilament yarn twisted with a z-stroke and at least one multifilament yarn twisted with an s-stroke, and wherein said z-stroke and said s-stroke are spaced apart from one another in a transverse direction of said belt.

20. The load-pulling system according to claim 15, wherein said fiber structure comprises a plurality of multifilament yarns twisted with a z-stroke and a plurality of multifilament yarns twisted with an s-stroke, and wherein the z-twisted multifilament yarns alternate with the s-twisted multifilament yarns in a transverse direction of said belt.

* * * * *